United States Patent
Ruede

(10) Patent No.: US 7,291,661 B2
(45) Date of Patent: *Nov. 6, 2007

(54) NON-STAINING POLYMER COMPOSITE PRODUCT

(75) Inventor: Paul Ruede, Brooklyn, MI (US)

(73) Assignee: Certainteed Corporation, Valley Forge, PA (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/020,580

(22) Filed: Dec. 27, 2004

(65) Prior Publication Data

US 2005/0280176 A1 Dec. 22, 2005

Related U.S. Application Data

(63) Continuation of application No. 10/445,321, filed on May 27, 2003, now abandoned, which is a continuation of application No. 09/893,012, filed on Jun. 28, 2001, now Pat. No. 6,590,014.

(51) Int. Cl.
*B29C 47/00* (2006.01)

(52) U.S. Cl. .................. 524/13; 524/306; 524/314; 524/425; 524/296

(58) Field of Classification Search ............... 524/13, 524/306, 314, 425, 296
See application file for complete search history.

(56) References Cited

U.S. PATENT DOCUMENTS

| 4,717,742 A | 1/1988 | Beshay ............... 524/13 |
| 5,008,310 A | 4/1991 | Beshay ............... 524/13 |
| 5,997,784 A | 12/1999 | Karnoski ............ 264/51 |
| 6,114,428 A | 9/2000 | Mortimer ........... 524/427 |
| 2005/0280176 A1 | 12/2005 | Ruede |

OTHER PUBLICATIONS

Composite of Poly(Vinyl Chloride) and Wood Fibers, Part II: Effect of Chemical Treatment, B.V. Kokta et al., Centra de recherche en pates et papiers, Universite du Quebec a Trois-Rivieres, Trois-Rivieres, Quebec, Canada G9A 5H7, Polymer Composites, Apr. 1990, vol. 22, No. 2, pp. 84-89.

Brochure: Boardwalk Composite Lumber, CertainTeed Corporation © Feb. 2000.

*Primary Examiner*—Peter D. Mulcahy
(74) *Attorney, Agent, or Firm*—Duane Morris LLP

(57) ABSTRACT

A polymeric composite is provided which has improved stain preventative properties by virtue of inclusion of at least one compound having multiple functional groups capable of reacting with tannins contained in a tannin containing cellulosic material present in the composite, and a method for its production and prevention of water stains thereon.

36 Claims, 5 Drawing Sheets

Vescalagin $R_1$ = H; $R_2$ = OH;
Castalagin $R_1$ = OH; $R_2$ = H;
Grandinin $R_1$ = H; $R_2$ = L;
Roburin E $R_1$ = H; $R_2$ = X;

Lyrose (L) $R_1$ = H; $R_2$ = OH;
Xylose (X) $R_1$ = OH; $R_2$ = H

Roburin A R₁ = H; R₂ = OH;
Roburin D R₁ = OH; R₂ = H;
Roburin B R₁ = H; R₂ = L;
Roburin C R₁ = H; R₂ = X;

NON-STAINING POLYMER COMPOSITE PRODUCT

CROSS-REFERENCE TO RELATED APPLICATIONS

This application is a continuation of U.S. application Ser. No. 10/445,321, filed May 27, 2003, abandoned, which is a continuation of U.S. application Ser. No. 09/893,012 filed Jun. 28, 2001, now U.S. Pat. No. 6,590,014.

BACKGROUND OF THE INVENTION

1. Field of the Invention

The present invention relates to a polymeric composite product that resists staining when contacted with moisture, and a method for its production.

2. Discussion of the Background

Lumber, particularly decking lumber, is a multi-billion dollar industry. In the decking lumber industry alone, there are over 30 million existing decks in the United States, with 3 million decks being built, repaired or replaced every year. One primary type of lumber used in the decking industry is pressure treated wood, typically made by impregnating the wood with a composition containing, among other things, arsenic under high pressure.

Synthetic lumber has been used as a substitute for wood, particularly in areas where wood can deteriorate quickly due to environmental conditions. Modern recycling techniques and low cost extrusion processes have greatly increased the market for such synthetic lumber products.

One synthetic alternative to pressure treated wood that has arisen is composite lumber, generally defined as any blend of plastics and wood or other natural fibers. Composite lumber is rapidly becoming the preferred alternative to pressure treated wood, with the market for composite and plastic lumber growing at an annual rate of 11%, with that rate estimated to continue for the next decade. The composite lumber products are preferred over pressure treated wood due to toxicity reasons, as well as the lower maintenance required for composite or plastic products relative to wood decking.

Unfortunately, conventional composite lumber products are not without their drawbacks also. One of the most significant problems associated with conventional composite lumber is that of staining when the product is contacted with moisture. There is a need in the industry for a composite lumber product that retains the advantages of conventional products but which does not show water-spots or staining when contacted with water and allowed to dry.

SUMMARY OF THE INVENTION

Accordingly, one object of the present invention is to provide a composite lumber composition that does not exhibit staining when contacted with moisture.

A further object of the present invention is to provide a method for preparing a composite lumber composition having consistency of appearance and that avoids staining.

These and other objects of the present invention have been satisfied by the discovery of a polymeric composite product comprising about 35-75 wt % of a resinous material, about 25-65 wt % of a tannin containing cellulosic fiber material, calcium carbonate and an amount of a stain preventive agent sufficient to suppress leaching of tannins from the cellulosic material upon application of moisture to a surface of the product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
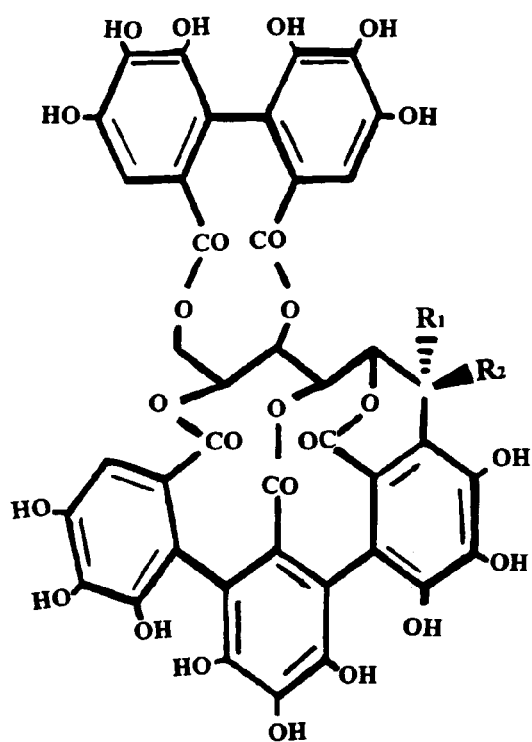
FIG. 1 provides structures for various compounds found in oak tannins (structures from J.-L. Puech et al, "The Tannins of Oak Heartwood: Structure, Properties, and Their Influence on Wine Flavor", *International Symposium on Oak in Winemaking/Am. J. Enol. Vitic.*, Vol. 50, No. 4, pp 469-478 (1999)).
Figure 1:
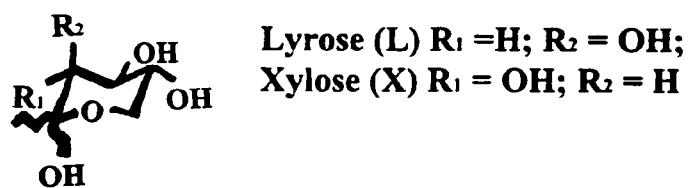

The present invention relates to a polymeric composite product comprising about 35-75 wt % of a resinous material, about 25-65 wt % of a tannin containing cellulosic fiber material, calcium carbonate and an amount of a stain preventive agent sufficient to suppress leaching of tannins from the cellulosic material upon application of moisture to a surface of the product.

The polymeric composite product of the present invention is a composite of about 35-75 wt % of resinous materials, such as thermoplastic or thermosetting resins. Suitable resinous materials include, but are not limited to, polyvinyl chloride (PVC), polyethylene, polypropylene, nylon, polyesters, polysulfones, polyphenylene oxide, polyphenylene sulfide, epoxies, cellulosics, and mixtures or blends thereof. The resinous material of the present composition may be virgin material or can be obtained by recycling resinous materials from any of a variety of sources. The resinous material of the present invention can be water-white or pigmented as desired.

The resinous material is most preferably PVC. PVC thermoplastics comprise the largest volume of thermoplastic polymers in commercial use. Vinyl chloride monomer is made from a variety of different processes typically involving reaction of acetylene and hydrogen chloride or the direct chlorination of ethylene. The polymerization is conventionally carried out by radical polymerization of vinyl chloride. The PVC is typically combined with conventional polymer additives, including but not limited to, impact modifiers, thermal stabilizers, lubricants, plasticizers, organic and inorganic pigments, fillers, biocides, processing aids, and flame retardants. The PVC can also be a copolymer of vinyl chloride monomer and one or more other copolymerizable monomers. The copolymer can be any type of copolymer, including but not limited to linear copolymers, block copolymers, graft copolymers, random copolymers, and regular repeating copolymers.

Suitable copolymerizable monomers that can be included in the PVC for the present invention preferred embodiments include, but are not limited to, acrylonitrile; alpha-olefins such as ethylene or propylene; chlorinated monomers, such as vinylidene dichloride; acrylate monomers such as acrylic acid, methyl acrylate, methyl methacrylate, acrylamide, and hydroxyethyl acrylate; styrenic monomers such as styrene, alpha methyl styrene or vinyl toluene; vinyl acetate; or any other ethylenically unsaturated copolymerizable comonomer. Preferably the PVC of the preferred embodiments is at least 50 wt % vinyl chloride monomers with the remainder being one or more of the copolymerizable monomers. The PVC's used in the present composition can have a range of physical properties and can be alloyed or blended with other polymers as desired. Suitable alloying polymers include, but are not limited to ABS, acrylic, polyurethane and nitrile rubber. Such alloys or blends can provide improved impact resistance, tear strength, resilience and/or processability.

In a preferred embodiment of the present invention, the resinous material is rigid PVC, optionally containing a small amount of plasticizer. The PVC is hard and tough and can be compounded to a wide range of properties, including impact resistance and weatherability (i.e. fading color to a wood grey appearance). The PVC preferably has a tensile strength of about 6,000-7,500 psi, a percent elongation of about 40-80%, and a tensile modulus of about $3.5-6.0 \times 10^6$ psi. It can be used without chlorination to about 140° F., and with chlorination to about 220° F. It also has a coefficient of thermal expansion of about $3-6 \times 10^{-5}$ inch/inch-° F.

The composition of the present invention can be prepared by any conventional polymer handling technique, including but not limited to, injection or vacuum molding, or extrusion and drawing. In a preferred embodiment, a mixture of PVC regrind and/or virgin PVC is compounded and then heated and extruded through a die to produce boards and other shapes having any desired length, width and thickness, preferably lengths ranging from 4 to 20 feet and widths or thicknesses ranging from 0.05 to 6.0 inches. The extruded products can be further processed by molding, calendering and finishing to add surface textures or wood grain appearance.

The composition of the present invention further comprises a tannin containing cellulosic material, preferably cellulosic fibers or cellulosic flours from recycled paper products, soft woods or hard woods. More preferred cellulosic materials are those obtained from hard woods due to their lower capacity to absorb moisture, with wood flour being more preferred and of these, oak flour being most preferred. The oak flour is preferably of about 10-100 mesh, most preferably about 20-30 mesh.

One or more additional fiber or flour type fillers can also be present in the present invention composite, although in a preferred embodiment, the only such filler is the wood flour, preferably oak flour.

In a preferred embodiment, the resin and wood flour components are combined with a chemical blowing agent, or a gaseous medium is introduced into a molten mixture of the resin and wood fiber to produce a series of trapped bubbles prior to thermo-forming the mixture, for example, by molding, extrusion, or co-extrusion. These thermo-forming processes, as well as the methods for making foamed polymer articles are well known in the art.

In a preferred process for making the composite of the present invention, a quantity of PVC (virgin and/or regrind) in small chunks is mixed with 20-30 mesh wood flour (preferably oak flour), which has been pre-dried to release any trapped moisture as steam. The mixture also can include a melt enhancer, such as a high molecular weight acrylic modifier, which improves melt elasticity and strength and enhances cellular structure, cell growth and distribution.

As noted above, the polymer composite of the present invention can be foamed by use of a chemical blowing agent or gas. Such a chemical blowing agent or gas can be added to the mixture to reduce the density and weight of the composite. The amount of blowing agent or gas is not particularly limited. Preferably the blowing agent is added in an amount of from 0.5 to 1.5 phr (parts per hundred parts of polymer resin), more preferably from 1.0 to 1.5 phr. This density reduction allows the composite product to better simulate wood in its ability to be nailed, drilled, and screwed. If a chemical blowing agent is used, it can be added at any point during the process that is suitable for producing a foamed product. Preferably it is mixed into the compound during blending or at the feed throat of the extruder. In the extruder, the blowing agent is decomposed, disbursing gas, such as nitrogen or carbon dioxide, into the melt. As the melt exits the extrusion die, the gas sites experience a pressure drop, expanding them into small cells or bubbles trapped by the surrounding polymer.

Chemical blowing agents useful in the present composition include any conventional blowing agent which releases a gas upon thermal decomposition. Chemical blowing agents may also be referred to as foaming agents. The blowing agent, or agents, if more than one is used, can be preferably selected from chemicals containing decomposable groups such as azo, N-nitroso, carboxylate, carbonate, heterocyclic, nitrogen-containing and sulfonyl hydrazide groups. Generally, they are solid materials that liberate gas when heated by means of a chemical reaction or upon decomposition. Preferred blowing agents include, but are not limited to, azodicarbonamide, bicarbonates, dinitrosopentamethylene, tetramethylene tetramine, p,p'-oxy-bis(benzenesulfonyl)-hydrazide, benzene-1,3-disulfonyl hydrazide, azo-bis(isobutyronitrile), biuret and urea.

The blowing agent can be added to the polymer in several different ways which are known to those of skill in the art. Suitable methods include, but are not limited to, adding the solid powder, liquid or gaseous agents directly to the resin in the extruder while the resin is in the molten state to obtain uniform dispersion of the agent in the molten plastic or adding to the resin prior to entry into the extruder. Preferably the blowing agent is added before the extrusion process and is in the form of a solid. The temperature and pressure to which the foamable composition of the invention are subjected to provide a foamed composition will vary within a wide range, depending upon the amount and type of the foaming agent, resin, and cellulosic material that is used. Preferred foaming agents are selected from endothermic and exothermic varieties, such as dinitrosopentamethylene tetrameine, p-toluene sulfonyl semicarbazide, 5-phenyltetrazole, calcium oxalate, trihydrazino-s-triazine, 5-phenyl-3,6-dihydro-1,3,4-oxadiazin-2-one, 3,6-dihydro-5,6-diphenyl-1,3,4-oxadiazin-2-one, azodicarboamide, sodium bicarbonate, and mixtures thereof.

The foamed composition of the preferred embodiments preferably has a specific gravity of 1.25 g/cc or less, more preferably 1.20 g/cc or less, most preferably 1.07 g/cc or less. The porosity of the preferred embodiments preferably is at least about 1%, more preferably about 5-40% by volume of solids in the composite. Even though these specific gravity and porosity values provide a preferred product that is lightweight, the preferred product has a flexural modulus, tensile modulus, and/or Young's modulus of about 100,000 to 450,000 psi.

In addition to the above, a coloring agent can be added to the compounded mixture, such as dyes, colored pigments, fly ash, carbon black, or a mixture of two or more of these, depending on the resulting color desired and cost considerations. Such additives can provide "weatherability" or a faded greyish coloring or a permanent tint, such as blue, green or brown.

The composite of the present invention further comprises calcium carbonate as filler. The calcium carbonate can be contained in any amount up to the point where the polymer fiber composite product loses its physical properties required for the desired end use. Preferably, the composite comprises up to 50 wt % of calcium carbonate ($CaCO_3$), more preferably up to 15 wt %, most preferably up to about 5 wt %, based on total amount of composite. The calcium carbonate can be specifically added to the composition, or can result from the use of polymer resin regrind having calcium carbonate therein. Most regrind PVC contains calcium carbonate, up to about 5-8 wt %. Regrind sources that contain calcium carbonate include, but are not limited to, recycled vinyl siding, windows and pipes. Such regrind is desirable in the production of polymeric wood substitutes since it lowers the cost, while little or no sacrifice in properties is observed. However, the presence of calcium carbonate in such polymeric wood substitutes, particularly PVC wood substitutes that also contain wood fiber or wood filler, results in staining when the product is contacted with water. The water causes tannins in the wood fiber or wood flour to leach to the surface and cause the appearance of unsightly stains.

Figure 2:
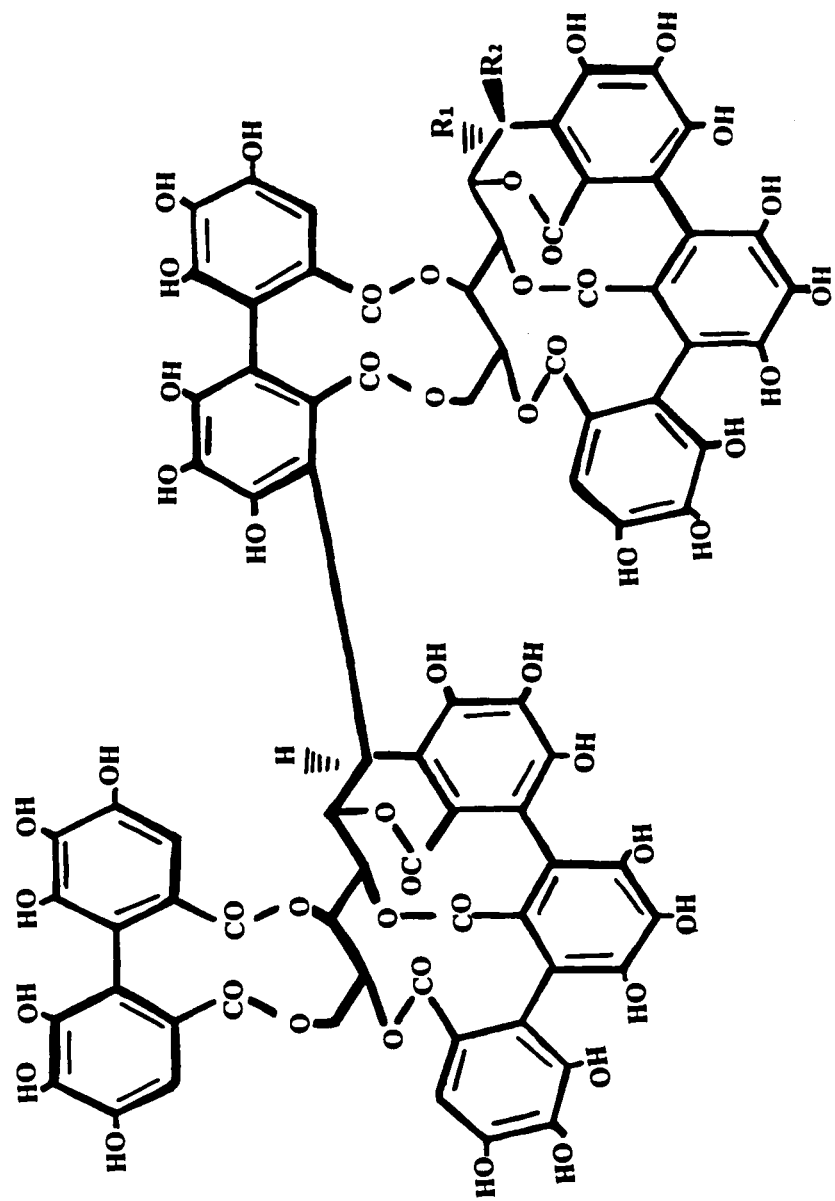
FIG. 2 provides structures for additional compounds found in oak tannins (structures from J.-L. Puech et al, "The Tannins of Oak Heartwood: Structure, Properties, and Their Influence on Wine Flavor", *International Symposium on Oak in Winemaking/Am. J Enol. Vitic.*, Vol. 50, No. 4, pp 469-478 (1999)).
Figure 3:
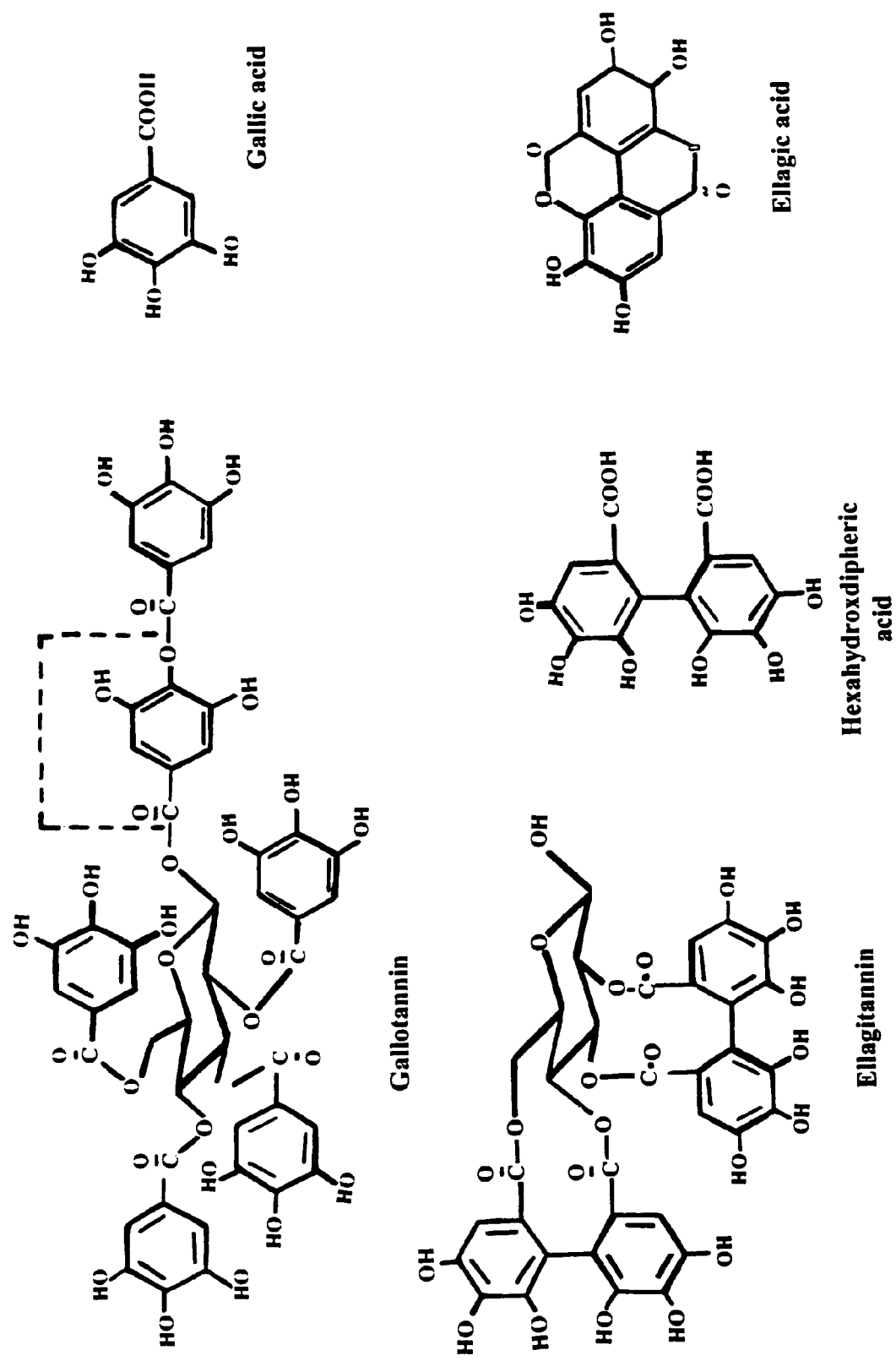
FIG. 3 provides structures for various tannin chemical precursors (structures obtained from Cornell University animal science website, www.ansci.cornell.edu).

Since the fiber material of the present invention contains tannins, it is necessary to add an amount of a stain preventive agent sufficient to prevent leaching and deposition of tannins from the cellulosic fiber to the surface of the composite product upon contacting the product with water. Tannins, within the context of the present invention, include any of the series of compounds contained in cellulosic materials having structures similar to vescalagin, castalagin, grandinin, roburins A-E, portions of tannins such as lyxose, or xylose, as well as chemical precursors thereto, such as gallotannin, gallic acid, ellagitannin, hexahydroxydiphenic acid and ellagic acid (structures of these materials are provided in FIGS. 1-3). Unfortunately, many tannins (lower molecular weight ones) are soluble in water, thus becoming solubilized and leaching to the surface of polymer-fiber composites when contacted with water. This leaching and deposition on the surface of the product produces unsightly brown stains on the surface of the product, having a negative impact on consumer satisfaction.

The stain preventive agent of the present invention is a compound that has the ability to either couple two or more of these tannin molecules to one another, couple a tannin molecule to a cellulosic unit in the cellulosic fiber itself, or both. This causes the tannins to lose their solubility and not be leached/deposited to the surface of the product, thus minimizing staining. The amount of stain preventive agent required is the amount sufficient to suppress the tannin leaching process. This amount will vary depending on the particular stain preventive agent used. The stain preventive agent is preferably a di (or higher) functional compound wherein the functionality has the ability to readily react with one or more of the hydroxyl groups present in the tannins contained in the cellulosic fiber material. Preferred stain preventive agents include, but are not limited to, organic di or polyacids and their anhydrides, preferably diacids and anhydrides, most preferably succinic acid, succinic anhydride, maleic acid, maleic anhydride, glutaric acid, glutaric anhydride, adipic acid, phthalic acid and phthalic anhydride. The amount of stain preventive agent is limited only by the tendency of the agent to plate out of the composition. This plate-out level varies depending on the particular agent and is readily determined by one of ordinary skill in the art. For example, the most preferred succinic anhydride tends to plate out at about 4 wt % based on total composition. Adipic acid tends to plate out at about 2 wt % based on total composition.

Having generally described this invention, a further understanding can be obtained by reference to certain specific examples which are provided herein for purposes of illustration only and are not intended to be limiting unless otherwise specified.

EXAMPLES

Varying Succinic Anhydride and Calcium Carbonate—A trial was performed using a 35-mm extruder die and a PVC based polymer composition to which was added varying levels of succinic anhydride and calcium carbonate, to determine the optimum level of succinic anhydride that is effective at lower calcium carbonate levels, corresponding to the use of PVC regrind which usually contains about 5-8 wt % of calcium carbonate. The PVC composition was conventional BOARDWALK® product from CertainTeed Corporation, a Saint-Gobain company, which contains about 62% compounded PVC and about 38% of oak flour. The standard batch (1) was added to the hopper, with all other materials added manually to the extruder. Flood feed conditions were maintained throughout.

Approximately 8-inch samples representative samples from each formula variation were cut and subjected to spot testing with distilled water. About 3 mLs of distilled water were placed on a surface of the sample and permitted to dry for approximately 32 hours, after which the sample was observed for visible staining.

The following compositions were prepared and tested, using Ross and Henschel mixers:

1—Control, 11 kg boxed batch of PVC containing oak flour as noted above, plus 66 g of Celogen® AZRV modified azodicarbonamide from Uniroyal Chemical Company, a Crompton business, as blowing agent.

2—Composition #1 plus calcium carbonate equal to 1.3 wt % based on PVC content.

2A—Composition #2 plus succinic anhydride equal to 0.16 wt % based on total composition.

2B—Composition #2 plus succinic anhydride equal to 0.32 wt % based on total composition.

3—Composition #1 plus calcium carbonate equal to 2.5 wt % based on PVC content.

3A—Composition #3 plus succinic anhydride equal to 0.32 wt % based on total composition.

3B—Composition #3 plus succinic anhydride equal to 0.6 wt % based on total composition.

4—Composition #1 plus calcium carbonate equal to 5 wt % based on PVC content.

4A—Composition #4 plus succinic anhydride equal to 0.6 wt % based on total composition.

4B—Composition #4 plus succinic anhydride equal to 1.2 wt % based on total composition.

Figure 4:
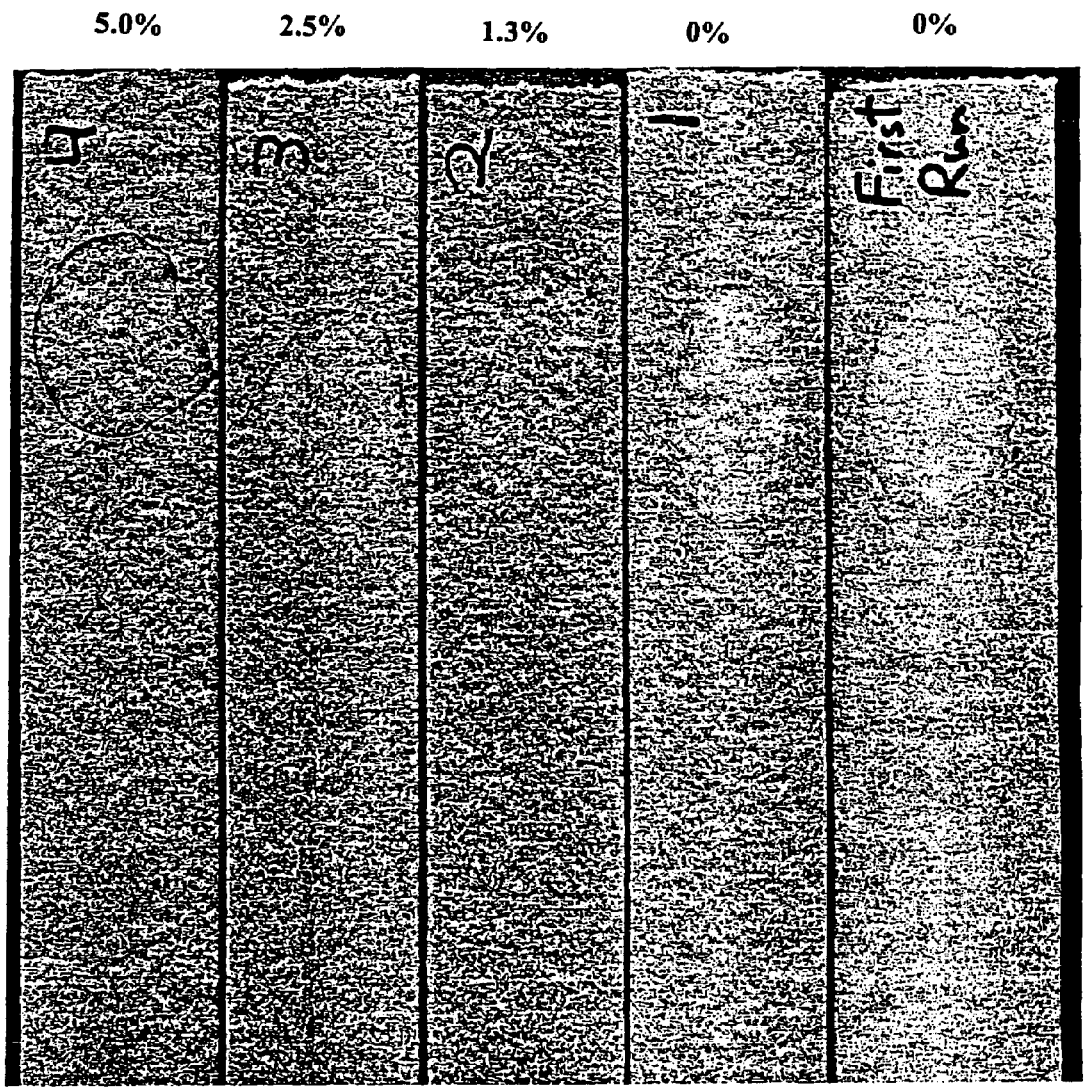
FIG. 4 shows the results of water staining tests on PVC/oak flour compositions containing various levels of calcium carbonate.
Figure 5:
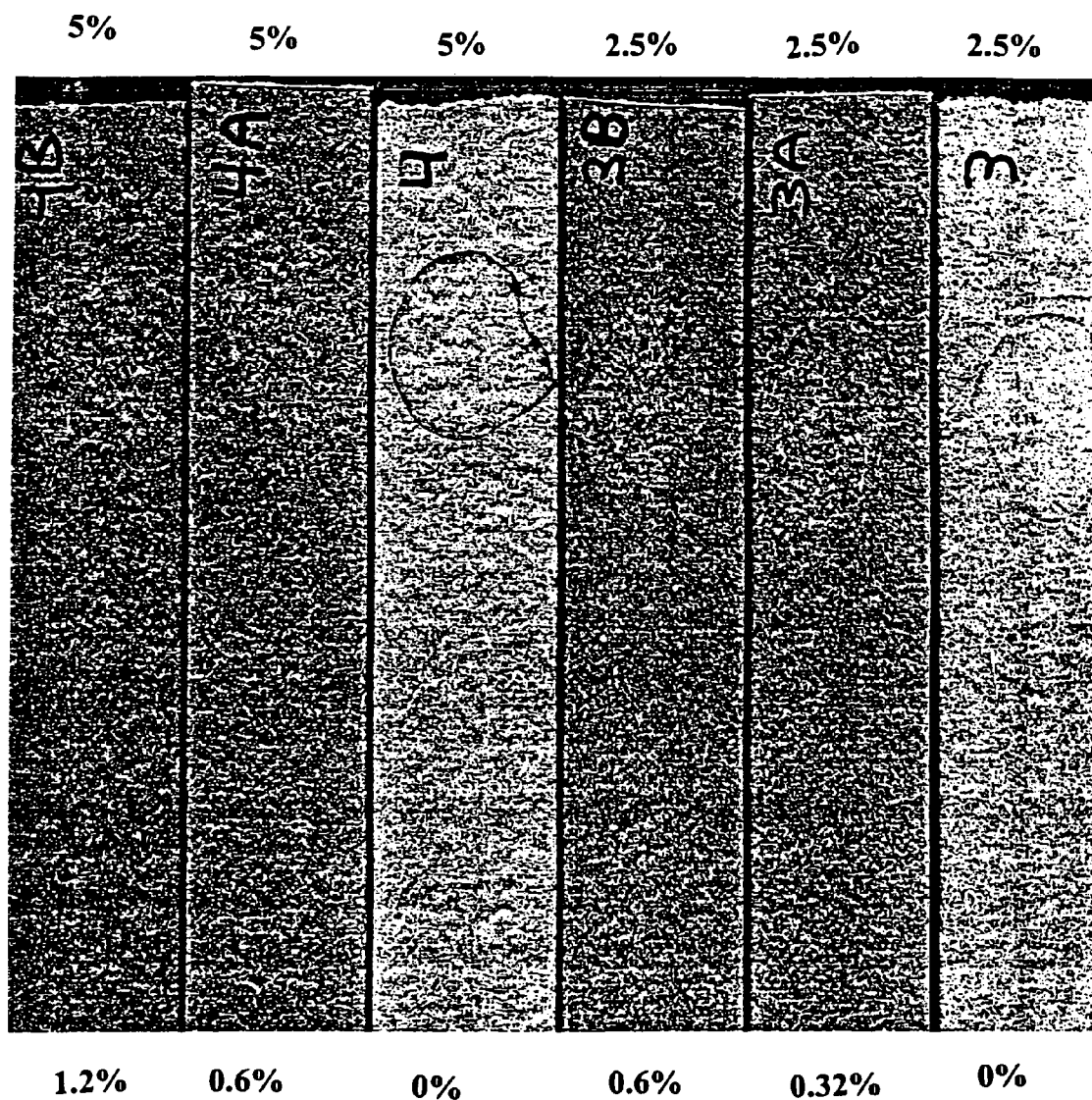
FIG. 5 shows the results of water staining tests on PVC/oak flour compositions containing various levels of calcium carbonate, to which various levels of succinic anhydride have been added.

The results are shown in FIGS. 4-5.

The tests showed that the amount of succinic anhydride needed to be effective at stain prevention varies directly as the amount of calcium carbonate in the composition. When the amount of calcium carbonate is low, about 1.3% or less, there is no noticeable staining even without the stain preventive agent. However, when the level of calcium carbonate increased above about 1.3%, the level of succinic anhydride needed to prevent staining by tannins also increased, with about 0.32% succinic anhydride needed with about 2.5% calcium carbonate present, while about 0.6% succinic anhydride was needed with about 5% calcium carbonate present.

Test of Addition of Succinic Anhydride to PVC/Oak Flour Product at 8 wt % Calcium Carbonate—A trial was performed using the same BOARDWALK® composition as in the above example, to which 8 wt % of calcium carbonate (based on PVC content) was added to simulate the "worst case" scenario of using 100% regrind PVC. Three batches were tested—1) a Control batch containing 8 wt % calcium carbonate and no succinic anhydride; 2) a batch in which succinic anhydride was added to the Control to give total succinic anhydride level of 1.3 wt % based on total composition; and 3) a batch in which succinic anhydride was added to the Control to give total succinic anhydride level of 1.92 wt % based on total composition. Samples of each batch at room temperature were subjected to the water staining test. In the test, two puddles were made on each sample. One puddle was formed from a single 3 mL pipette of water, while the second puddle was formed using three 3 mL pipettes of water. After drying for 20 hours the samples were observed for staining. The Control batch showed dark spots for both single and triple squirt locations, with the triple squirt location being nearly black in appearance. The 1.3 wt % succinic anhydride batch showed a very weak spot to no spot at all for the single squirt test, while the triple squirt test showed staining, but considerably less than the Control. The 1.9 wt % succinic anhydride batch showed virtually no stain in the single squirt test, and only minimal staining in the triple squirt test. Accordingly, even at the maximum level of calcium carbonate corresponding to complete use of regrind PVC, the addition of the succinic anhydride showed significant improvements in stain prevention, particularly at levels of above 1.3 wt %.

Obviously, additional modifications and variations of the present invention are possible in light of the above teachings. It is therefore to be understood that within the scope of the appended claims, the invention may be practiced otherwise than as specifically described herein.

The invention claimed is:

1. A non-staining polymer composite product, comprising:
   a polymer matrix combined with a filler and a cellulosic material;
   the filler comprising calcium carbonate capable of reaction with tannin to produce a stain on the surface of the product, and the cellulosic material comprising tannin molecules, wherein some of the tannin molecules would be susceptible to leaching from the cellulosic material due to the product coming into contact with moisture, to make available leached tannin molecules for reaction with the calcium carbonate to produce the stain; and
   a compound combined in the product with the polymer matrix, the filler and the cellulosic material, the compound comprising at least two functional groups for reaction with one or more hydroxyl groups present in the tannin molecules, wherein at least some of the compound reacts with at least some of the tannin molecules to prevent such tannin molecules from being made available as leached tannin molecules for reaction with the calcium carbonate to produce the stain.

2. The polymeric composite product of claim 1, wherein said polymer matrix comprises a polymer selected from the group consisting of thermoplastic and thermosetting resins.

3. The product of claim 1, wherein said cellulosic material comprises a member selected from the group consisting of cellulosic fibers and cellulosic flours.

4. The product of claim 3, wherein said cellulosic material comprises a wood flour.

5. The product of claim 1, wherein said compound comprises a member selected from organic diacids and anhydrides thereof.

6. The polymeric composite product of claim 1, wherein said compound comprises a member selected from the group consisting of succinic acid, succinic anhydride, maleic acid, maleic anhydride, glutaric acid, glutaric anhydride, adipic acid, phthalic acid and phthalic anhydride.

7. The product of claim 1, wherein said polymer matrix comprises PVC, said tannin containing cellulosic material comprises oak flour and said compound having comprises succinic anhydride.

8. The product of claim 1, wherein said polymer matrix comprises from 35 to 75 wt % of PVC; said cellulosic material comprises from 25 to 65 wt % of oak flour; said calcium carbonate comprises a non-zero amount of calcium carbonate up to about 15 wt % based on PVC content; and said compound comprises from 0.1-5% of succinic anhydride.

9. The product of claim 1, wherein said polymer matrix comprises a polymer selected from the group consisting of PVC, polyethylene, polypropylene, nylon, polyesters, polysulfones, polyphenylene oxide, polyphenylene sulfide, epoxies, cellulosics, and mixtures and blends thereof.

10. The product of claim 1, wherein said polymer matrix comprises PVC.

11. The product of claim 1, wherein said cellulosic material comprises a member selected from the group consisting of cellulosic fibers and cellulosic flours, in turn, selected from the group consisting of recycled papers, soft woods and hard woods.

12. The product of claim 1, wherein said cellulosic material comprises oak flour.

13. The product of claim 1, wherein the filler comprises regrind PVC made from recycled material containing the calcium carbonate.

14. The product of claim 13, wherein the recycled material comprises one of, vinyl siding, windows or pipes or a combination of two or more thereof.

15. The product of claim 1, wherein said some of the compound reacts with said at least some of the tannin molecules to couple each of said such tannin molecules to the cellulosic material or to another of such tannin molecules.

16. A method for making a non-staining polymer composite product comprising:
   combining a filler, a cellulosic material and a compound in a polymer matrix; and
   forming the product having the filler, the cellulosic material and the compound in the polymer matrix;
   the filler comprising calcium carbonate capable of reaction with tannin to produce a stain on the surface of the product;
   the cellulosic material comprising tannin molecules, wherein some of the tannin molecules would be susceptible to leaching from the cellulosic material due to the product coming into contact with moisture, to make available leached tannin molecules for reaction with the calcium carbonate to produce the stain; and the compound comprising at least two functional groups for reaction with one or more hydroxyl groups present in the tannin molecules, such that at least some of the compound reacts with at least some of the tannin molecules to prevent such tannin molecules from being made available as leached tannin molecules for reaction with the calcium carbonate to produce the stain.

17. The method of claim 16, wherein the filler comprises recycled material containing the calcium carbonate.

18. The method of claim 16, wherein the recycled material comprises vinyl siding, windows, pipes or a combination thereof.

19. The method of claim 16, wherein said polymer matrix comprises a polymer selected from the group consisting of thermoplastic and thermosetting resins.

20. The method of claim 16, wherein said cellulosic material comprises a member selected from the group consisting of cellulosic fibers and cellulosic flours.

21. The method of claim 16, wherein said cellulosic material comprises a wood flour.

22. The method of claim 16, wherein said compound comprises a member selected from organic diacids and anhydrides thereof.

23. The method of claim 16, wherein said compound comprises a member selected from the group consisting of succinic acid, succinic anhydride, maleic acid, maleic anhydride, glutaric acid, glutaric anhydride, adipic acid, phthalic acid and phthalic anhydride.

24. The method of claim 16, wherein said polymer matrix comprises PVC, said tannin containing cellulosic material comprises oak flour and said compound comprises succinic anhydride.

25. The method of claim 16, wherein said polymer matrix comprises from 35 to 75 wt % of PVC; said cellulosic material comprises from 25 to 65 wt % of oak flour; said calcium carbonate comprises a non-zero amount of calcium carbonate up to about 15 wt % based on PVC content; and said compound comprises from 0.1-5% of succinic anhydride.

26. The method of claim 16, wherein said polymer matrix comprises a polymer selected from the group consisting of PVC, polyethylene, polypropylene, nylon, polyesters, polysulfones, polyphenylene oxide, polyphenylene sulfide, epoxies, cellulosics, and mixtures and blends thereof.

27. The method of claim 16, wherein said polymer matrix comprises PVC.

28. The method of claim 16, wherein said cellulosic material comprises a member selected from the group consisting of cellulosic fibers and cellulosic flours, in turn, selected from the group consisting of recycled papers, soft woods and hard woods.

29. The method of claim 16, wherein said cellulosic material comprises oak flour.

30. The method of claim 16, wherein the filler comprises regrind PVC made from recycled material containing the calcium carbonate.

31. The method of claim 30, wherein the recycled material comprises one of, vinyl siding, windows or pipes or a combination of two or more thereof.

32. The method of claim 16, wherein said some of the compound reacts with said at least some of the tannin molecules to couple each of such tannin molecules to the cellulosic material or to another of such tannin molecules.

33. The method of claim 16, wherein forming the product comprises forming the product by one of, molding, extrusion or drawing.

34. A method of preventing stain on a polymeric composite product, comprising:

combining a cellulosic material and a compound in a polymer matrix; and forming the product having the cellulosic material and the compound in the polymer matrix;

the cellulosic material comprising tannin molecules, wherein some of the tannin molecules would be susceptible to leaching from the cellulosic material due to the product coming in contact with moisture, to make available leached tannin molecules to produce the stain; and the compound comprising at least two functional groups capable of reaction with one or more hydroxyl groups of the tannin molecules; wherein at least some of the compound in the product reacts with at least some of the tannin molecules to prevent such tannin molecules from being made available as leached tannin molecules to produce the stain.

35. The method of claim 34, further comprising:

combining a filler with the polymer matrix and the cellulosic material prior to forming the product; and forming the product having the cellulosic material in the polymer matrix, and having the filler in the polymer matrix;

the filler comprising calcium carbonate capable of reaction with leached tannin molecules to produce the stain; and said at least some of the compound chemically reacting with said at least some of the tannin molecules to prevent such tannin molecules from being made available as leached tannin molecules for said reaction with the calcium carbonate to produce the stain.

36. The method of claim 34, wherein forming the product comprises forming the product by one of, molding, extrusion or drawing.

* * * * *